June 7, 1932. K. E. E. HOLZAPFEL 1,861,443
METHOD AND APPARATUS FOR FILLING BAGS
Filed April 1, 1930
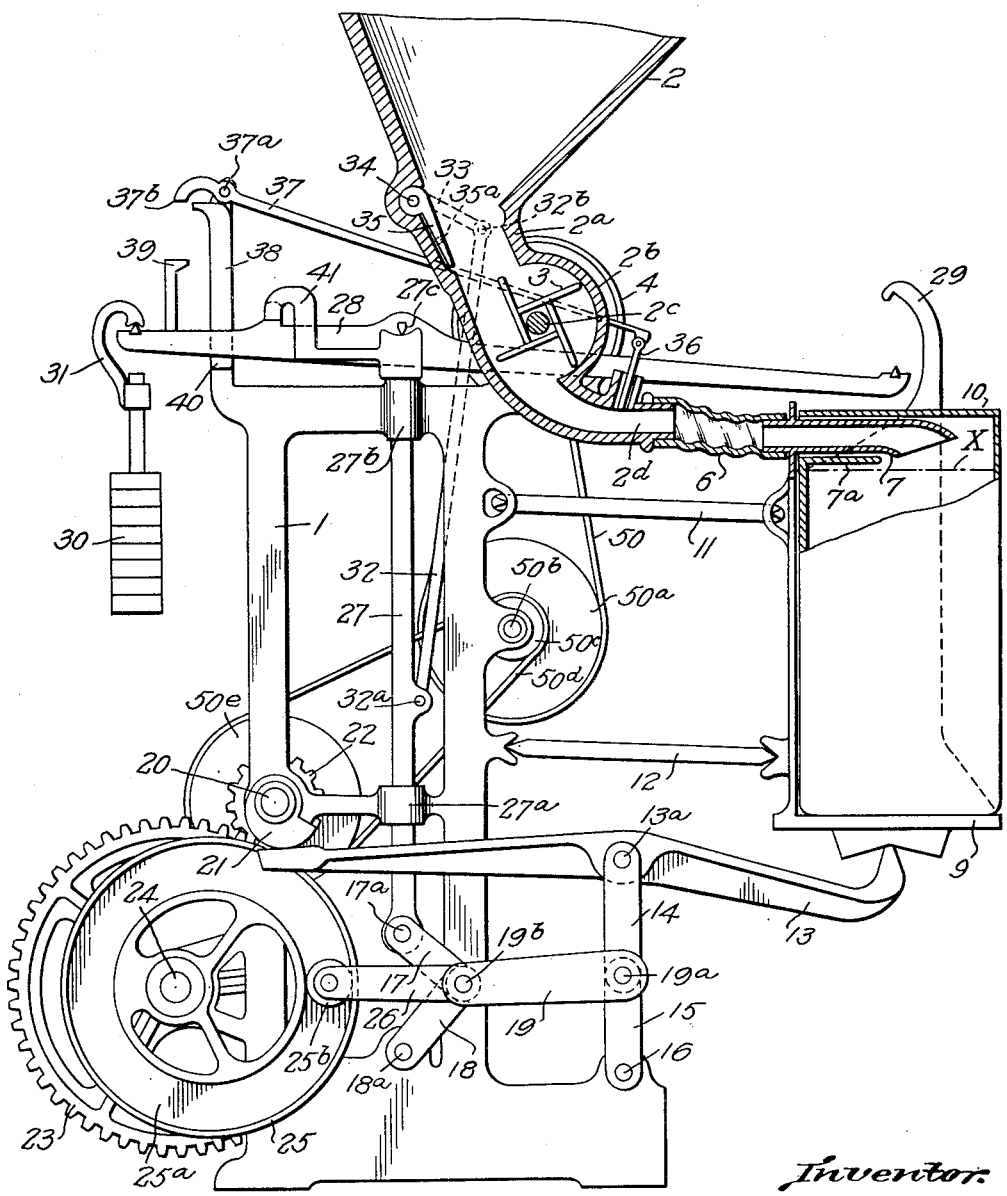
Inventor:
Karl Ernst Eberhardt Holzapfel,
By C. P. Goepel.
his Attorney.

Patented June 7, 1932

1,861,443

UNITED STATES PATENT OFFICE

KARL ERNST EBERHARDT HOLZAPFEL, OF MUNSTER, GERMANY

METHOD AND APPARATUS FOR FILLING BAGS

Application filed April 1, 1930, Serial No. 440,678, and in Germany August 15, 1928.

My invention relates to an apparatus for filling bags and similar containers, the invention being more particularly related to an improved construction whereby to fill the bags rapidly and in such manner that the material, as it is introduced into the bags, will be compacted therein so that on the completion of the filling operation the bag will be compactly filled and contain more material than would otherwise be the case. The apparatus of my invention is especially advantageous for filling bags of the kind having a valve-like inlet capable of closing automatically.

There are known filling devices in the use of which the material, in apportioned qualities, is either weighed or measured while being introduced into the bag, and there are also known devices whereby the bag during the filling operation is supported on some weighing instrumentality.

In the utilization of the devices for measuring or weighing the material before bagging it, one is not sure of putting the entire quantity of material into the bag, as some parts of the material may remain anywhere in the passageway between the weighing or measuring device and the interior of the bag. Where the bag is weighed during the filling operation, it must be handled delicately and in a manner to avoid impairing the precision of the weighing mechanism. Furthermore, under the known devices whereby the material is weighed as it is bagged, considerable time for bagging is required, and owing to the support of the bag upon some scale instrumentality, there can be no jogging of the bag in order to compact the material entered within it.

More particularly considered, the apparatus of my invention is an improved construction in which the bag is jogged up and down while being filled and until it is filled to a point where only a comparatively small quantity of additional material is required in order to complete the filling operation, and in which weighing mechanism is called into action to weigh the bag with its contents when the jogging has ceased and during the introduction of the additional material for fully filling the bag.

By my apparatus and mode of operation, the bag is jogged so as to compactly stow therein by far the greater quantity of material, whereupon it is automatically and accurately weighed, the weighing mechanism being arranged to function so as to continue the weighing operation until all of the material, necessary to complete the filling of the bag, has been introduced and weighed.

A further object of my invention is the provision of a simplified apparatus in which the filling, jogging and weighing operations will all be accomplished automatically, in which the weighing will be accurate, and which will enable a series of bags to be fully and compactly filled and accurately weighed, with great dispatch.

Other objects and aspects of the invention will appear hereinafter.

The invention resides in the improved apparatus and mode of operation for filling bags, and in the construction and relative arrangement of the parts, as will be hereinafter more fully described and subsequently pointed out in the subjoined claims.

My invention will be best understood by referring to the accompanying drawing, in which the single figure represents a side elevational view of my improved apparatus, parts being in section and parts being broken away.

In the drawing, wherein for purposes of illustration I have shown the preferred embodiment of my invention, 1 designates generically a suitable standard for supporting the various parts of the apparatus, and upon the top of the standard is mounted a hopper 2 for receiving the material to be introduced into the bags and which includes, intermediate the length of the delivery spout 2a, an enlarged portion 2b containing a rotary blade propeller 3 of any suitable form or design. The shaft 2c carrying the blade propeller may be driven from any suitable source of power; for instance, from an electric motor as fragmentally indicated by the numeral 4.

Attached to the outlet portion 2d of the delivery spout is a flexible pipe 6 which connects with and feeds into a spout 7 through which material is introduced into the bags. As represented in the drawing, the spout 7 is supported upon the upright back wall portion 8 of the bag frame or rest 9. A bag 10 of the valve type is illustrated upon the frame 9 in position to be filled with material and with the spout 10 entering through the self-closing filling opening 7a for introducing the material into the bag.

By means of two arms 11 and 12, the bag frame or rest 9 is hinge connected with the standard 1 and in such manner that it can be jogged vertically while being held in position against rocking or tilting movement. So connected with the standard by said arms the frame 9 is supported upon the outer end of a lever 13, fulcrumed at 13a upon the top end of a link 14 with which is pivotally united a link 15 having its lower end pivoted at 16 to the base of the standard. With the pivoted union 19a between the links 14 and 15 is connected a bar 19 with which at 19b are pivotally united two other links 17 and 18. At its lower end at 18a, the link 18 is pivoted to the base of the standard, while at its upper end at 17a, the upper link is pivoted to a rod 27, to be more fully referred to hereinafter. The two pairs of links 14, 15 and 17, 18 with the connecting bar 19, constitute a toggle arrangement, in which the links 14, 15 are in longitudinal aligned relation when the links 17, 18 are in angular relation; and in which, conversely, the first-named links are in angular relation when the second-named links are in longitudinally aligned relation.

In the present exemplification, through transmission parts including belt 50, wheel 50a, shaft 50b, pulley 50c, belt 50d and wheel 50e, power is transmitted from the electric motor 4 for driving the rotary shaft 20. With a cam 21, carried by the shaft 20, the inner end of the lever 13 has bearing engagement so that as the shaft 20 rotates the lever 13 will be rocked for jogging the frame 9 and bag resting thereon. Said shaft 20 carries a pinion 22 in engagement with a toothed wheel 23 on a shaft 24. Fixed to and turning with the shaft 24 is an eccentric cam disk 25 having a groove 25a. A roller 25b which turns in the groove 25a, is carried on the end of a bar 26 that is pivotally united at its opposite end with the bar 19 and links 17, 18.

The rod 27 is arranged in suitable bearings 27a and 27b for vertical actuation and is supported on the link 17. Fulcrumed intermediate its length at 27c to the top of the rod 27 is a horizontal scale beam 28, one end of which is adapted to engage an upwardly projecting hook 29 on the frame 9, while the other end supports the weight devices 30 which are suspended by means of a shackle 31. An upwardly extending rod 32 has at its lower end a pivotal connection at 32a with the rod 27, and at its upper end a similar connection at 32b with a crank arm 33 on the turning axis 34 of a gate valve 35 arranged in the hopper 2 and adapted to close the delivery spout so as to prevent the delivery of the material to the chamber containing the blade propeller 3. Combined with the outlet portion 2d of the delivery spout is a slide valve 36, and the means for actuating this valve consists of a rod 37 which is fulcrumed at 37a to the top of the stationary scale index 38. Attached to and movable with the scale beam 28 is an index 39 which cooperates with the stationary index 38 in order to indicate the weight of the bag upon the frame 9.

The operation of my improved apparatus is as follows:

The electric motor or other source of power is put in operation for continuously operating the working parts of the apparatus. By the operation of the blade propeller, the material to be bagged is drawn from the hopper and forced out through the spout portion 2d, flexible pipe 6 and delivery spout 7, whence to be deposited into bag 10, the self-closing mouth 7a of which is arranged in the usual well-known manner about the said spout 7. With the parts in the relative positions shown in the drawing, the frame 9 with the bag thereon is jogged up and down owing to the fact that the lever 13 has bearing contact with the rotating cam 21. The eccentric cam disk 25 is driven at a fixed relation with respect to the time required for automatically filling the bag so that when the bag is nearly full, say, for instance, to a point as indicated by the dash-dot line x, the connected bars 26 and 19 will be drawn to the left, straightening the links 17 and 18 into lengthwise aligned relation and drawing the links 14 and 15 into angular relation. The result of this operation is that the fulcrum point 13a will be lowered, thereby lowering the rocking lever 13, frame 9 and hook 29. At this stage, the rocking of the lever 13 continues since its inner end is still in bearing engagement with the revolving cam 21.

As the links 17 and 18 straighten into lengthwise alignment, the rod 27 is lifted, raising the scale beam 28. The end portion of the scale beam which bears the weights 30, is limited in its movements by a stop abutment 40 at the lower side and an obliquely related arm 41 at the upper side, said arm 41 being secured to and projecting from the top of the rod 27. As we have seen, the hook 29 is lowered with the frame 9 when the carrying lever 13 is lowered due to the actuation of the links 14 and 15 into angular relation, so that the lifting up of the rod 27 will result in substituting the scale beam 28 for the carrying lever 13 as the means by which to support the frame 9 and bag 10 thereon.

The weights 30 equal the weight of the bag completely filled. From the foregoing description, it will be understood that at the time when, through the lifting of the rod 27, the scale beam engages the hook 29 and becomes the sole support for the frame 9 and bag 10 thereon, for the weighing operation, the bag is not fully filled with material, being filled only up to the line x. Jogging of the bag of course ceases on transfer of the frame from the lever 13 to scale beam 28. As soon as the scale beam commences to weigh, it can be rocked from a position against the stop 41 to a position against the stop 40. The rod 32 is lifted up along with the rod 27 with the result that the crank 33 is operated to close the gate valve 35 and thereby prevent further material from passing from the hopper to the blade propeller 3. Consequently, the propeller can forward to the bag to complete the filling of the bag only the quantity of material contained in the delivery passageway below the gate valve 33. By this arrangement, only a restricted late stream of material can flow into the bag to complete the filling of the same. With the introduction into the bag of the final quantity of material, the weighted end rises slowly until the index 39, which accompanies the rising of the weighted end strikes the end 37b with the consequence that the rod 37 is actuated in a direction to effect thereby quick closing of slide valve 36. In this way, as the final amount of material is being introduced into the bag and weighed, provision is made for completely interrupting the flow of additional material when the bag is filled. If desired, the gate 35 may be provided with a relatively small aperture 35a through which a small amount of material will pass to the blade propeller even when the gate 35 is closed.

The bag 10, having thus been filled and weighed, is removed from the frame and replaced by another bag by known mechanism now in use for such purpose. As will be manifest, upon the completion of the revolution of the cam disk, when the bars 26 and 19 are forced to the right, the lever 13 will be elevated while the scale beam will be lowered, with the result that the frame 9 will again be deposited upon the lever 13 for the next filling operation.

While I have herein illustrated the preferred embodiment of my improved apparatus as reduced to practice, it is to be understood that in the further development of my apparatus, I reserve the right and privilege of resorting to all such legitimate changes and modification in the form, construction and relative arrangement of the various parts as may be fairly incorporated in the spirit and scope of the invention as claimed.

I claim:

1. An apparatus of the kind described comprising a standard provided with jogging mechanism and weighing mechanism at an elevation above the jogging mechanism, a frame connected with the standard for vertical movement and adapted to rest upon the jogging mechanism to be given jogging movement thereby, said weighing mechanism being mounted for elevating movement and arranged to weigh the frame and to lift the same from the jogging mechanism and into position in which to be weighed free of the jogging mechanism.

2. An apparatus of the kind described comprising a standard provided with jogging mechanism and weighing mechanism at an elevation above the jogging mechanism, a frame connected with the standard for vertical movement and adapted to rest upon the jogging mechanism to be given jogging movement thereby, said weighing mechanism having means for connection with the frame whereby to support the frame for weighing the same, and means for raising the weighing mechanism so as to effect lifting of the frame thereby from the jogging mechanism, to provide for weighing the frame independently of the jogging mechanism.

3. An apparatus of the kind described comprising a standard provided with jogging mechanism and weighing mechanism at an elevation above the jogging mechanism, a movable lift member supporting the weighing mechanism, a frame connected with the standard for vertical movement and adapted to rest upon the jogging mechanism to be given jogging movement thereby, said weighing mechanism having means for connection with the frame whereby to support the frame for weighing the same, and means for operating said lift member to cause elevation of the weighing mechanism and to effect lifting of the frame thereby from the jogging mechanism, so as to provide for weighing the frame independently of the jogging mechanism.

4. An apparatus of the kind described comprising a standard provided with jogging mechanism and weighing mechanism, with the latter arranged above the former, a frame connected with the standard for vertical movement and adapted to rest upon the jogging mechanism to be given jogging movement thereby, said weighing mechanism being mounted for elevating movement and arranged to perform weighing operations when elevated, and cooperating parts between the weighing mechanism and frame to afford a lifting connection between the same whereby to lift said frame up off the jogging mechanism into position to be weighed by the weighing mechanism, and means for elevating the weighing mechanism.

5. An apparatus of the kind described comprising a frame adapted to suport a bag to be filled, jogging mechanism and weighing mechanism adapted each to support the frame, said mechanism being constructed and arranged to alternate in the support of the frame, and each operative to receive the frame at a predetermined time from the other 6. An apparatus of the kind described comprising a frame adapted to support a bag to be filled, jogging mechanism and weighing mechanism, each constructed and arranged to support the frame independently of the other, and means for moving said mechanism into and out of position for supporting said frame, said means being operative to cause one of said mechanisms to take upon itself the support of said frame as the other of said mechanisms relinquishes the support of said frame.

7. An apparatus of the kind described comprising a frame adapted to support a bag to be filled, jogging mechanism and weighing mechanism, each constructed and arranged to support the frame independently of the other, means for moving said mechanisms into and out of position for supporting said frame, said means being operative to move the weighing mechanism into position to receive and support the frame as the jogging mechanism is moved out of position for supporting the frame.

8. An apparatus of the character described comprising a frame adapted to support a bag to be filled, jogging mechanism and weighing mechanism, each constructed and arranged to support the frame independently of the other, means for moving said mechanisms into and out of position for supporting said frame, and including operative connections between said mechanisms, said operative connections being arranged to cause one of said mechanisms to move into position to take upon itself the support of the said frame as the other of said mechanisms is moved to relinquish the support of said frame.

9. In apparatus of the character described, the combination of a frame adapted to support a container, jogging mechanism adapted to take upon itself the support of said frame, weighing mechanism adapted to take upon itself the support of said frame, each of said mechanisms being mounted for relative movement with respect to the other mechanism, to take said frame from the other mechanism and support said frame independently of the other mechanism, and means for moving each of said mechanisms.

10. An apparatus of the character described comprising a standard, jogging mechanism and weighing mechanism, toggle mechanism supporting said jogging and weighing mechanisms on the standard and actuable to raise the weighing mechanism, simultaneously with the lowering of the jogging mechanism, a frame connected with the standard for vertical movement and adapted to rest upon the jogging mechanism to be given jogging movement thereby, said weighing mechanism being arranged to engage with the frame and to lift the same free of the jogging mechanism, consequent upon the elevation of the weighing mechanism and lowering of the jogging mechanism.

11. An apparatus of the character described comprising a standard, jogging mechanism and weighing mechanism, toggle mechanism supporting said jogging and weighing mechanisms on the standard and actuable to raise the weighing mechanism simultaneously with the lowering of the jogging mechanism, a frame connected with the standard for vertical movement and adapted to rest upon the jogging mechanism to be given jogging movement thereby, said weighing mechanism being arranged to engage with the frame and to lift the same free of the jogging mechanism, consequent upon the elevation of the weighing mechanism and lowering of the jogging mechanism.

12. In apparatus of the kind described, the combination of means for feeding material, a movable frame adapted to hold a container for receiving the material from the feeding means, jogging mechanism on which to rest said frame for compacting the material entered into the container, movable weighing mechanism engageable with said frame, and means for moving the weighing mechanism so as to cause the latter to engage the frame and remove the frame from the jogging mechanism, to permit weighing of the frame with the supported container, independently of the jogging mechanism.

13. In apparatus of the kind described, the combination of means for feeding material, a movable frame adapted to hold a container for receiving the material from the feeding means, jogging mechanism on which to rest said frame for compacting the material entered into the container, movable weighing mechanism engageable with said frame, means for moving the weighing mechanism so as to cause the latter to engage the frame and remove the frame from the jogging mechanism, to permit weighing of the frame with the supported container, independently of the jogging mechanism, and valve means associated with the feeding means for controlling the feeding of the material, said valve being connected to be controlled by said moving means.

14. In apparatus of the kind described comprising jogging mechanism and weighing mechanism adapted to support the bag independently of one another, the combination therewith of additional mechanism for causing the weighing mechanism to automatically assume the support of the bag at the time the jogging mechanism relinquishes the support of the same.

15. In combination, jogging mechanism for supporting and jogging a bag, operative means controlling the same to produce the jogging action, weighing mechanism adapted to support the bag independently of the jogging mechanism, and means under the control of said operative means controlling the operation of the weighing mechanism and jogging mechanism, respectively, for causing the weighing mechanism to automatically assume the support of the bag at the time the jogging mechanism relinquishes the support of the bag.

16. In apparatus of the character described, the combination of means for feeding divided material into a bag, means to jog the bag as the material is fed thereinto, to compact the material in the bag, means for stopping the jogging action before the bag is filled to capacity, means for weighing the bag and contents, said means operative upon stopping of the jogging action, and means for discontinuing the feed of material upon full weight being reached.

17. In the art of bagging material, the steps consisting in feeding material into the bag while at the same time jogging the bag to compact the fed-in material, discontinuing the jogging shortly before the bag is filled to capacity, initially weighing the bag on discontinuance of the jogging thereof, and continuing the feeding and weighing until the bag is filled to capacity and finally weighed, said feeding being continuous from the beginning of the feeding to final weighing, and the jogging and weighing being carried on during the feeding as continuous progressive steps, thus without interruption, compacting the material for a full bag, filling the bag to, and weighing it at, full capacity.

In testimony that I claim the foregoing as my invention, I have signed my name hereto.

DR. K. E. E. HOLZAPFEL.